United States Patent [19]

Usui et al.

[11] 4,141,240
[45] Feb. 27, 1979

[54] FLOW RATE MEASURING DEVICE

[75] Inventors: Keizaburo Usui; Yoshikazu Hayakawa, both of Yokohama, Japan

[73] Assignee: Nissan Motor Company, Limited, Yokohama, Japan

[21] Appl. No.: 810,905

[22] Filed: Jun. 28, 1977

[30] Foreign Application Priority Data

Jul. 1, 1976 [JP] Japan .......................... 51-85858[U]

[51] Int. Cl.² ........................................ G01F 1/72
[52] U.S. Cl. ........................................ 73/114; 73/199
[58] Field of Search .................. 73/114, 199, 252; 138/30, 31

[56] References Cited

U.S. PATENT DOCUMENTS

| 213,944 | 4/1879 | Sanford | 73/252 |
|---|---|---|---|
| 1,893,685 | 1/1933 | Pirsch | 138/30 X |
| 2,094,457 | 9/1937 | Lattner | 138/30 X |
| 2,365,994 | 12/1944 | Ashton | 138/31 |
| 2,970,473 | 2/1961 | Kendig | 73/199 |
| 3,672,398 | 6/1972 | Ichiyu | 138/26 |
| 4,011,757 | 3/1977 | Baatz | 73/114 |

FOREIGN PATENT DOCUMENTS 228226 11/1910 Fed. Rep. of Germany ............ 73/198

*Primary Examiner*—Herbert Goldstein
*Attorney, Agent, or Firm*—Schwartz, Jeffery, Schwaab, Mack, Blumenthal & Koch

[57] ABSTRACT

A pressure bumper or buffer is connected to a passageway between a pump and an oscillating type of flow rate meter for eliminating or alleviating a pulsation of the pressure of a pressurized fluid generated in the passageway by the pump to prevent the flow rate meter from failing to sense the real value of the flow rate of fluid fed to fluid consuming means.

7 Claims, 10 Drawing Figures

FLOW RATE MEASURING DEVICE

BACKGROUND OF THE INVENTION

1. Field of the Invention

The present invention relates generally to an improvement in an oscillating type of flow rate meter for use in a fluid supply system wherein the meter tends to fail to sense the real value of a flow rate of fluid fed to a fluid consuming means, because of a pulsation in the pressure of a pressurized fluid generated by a pump. More particularly the present invention relates to an improvement in an oscillating type of flow rate meter for use in a fuel consumption measuring system for a motor vehicle wherein meter tends to fail to sense the real value of a flow rate of fuel fed to the engine, due to a pulsation in fuel pump pressure of a pressurized fuel.

2. Description of the Prior Art

As is well known in the art, as an expedient forming part of a system for measuring fuel consumption of a motor vehicle such as an automobile, a fuel flow rate sensor is provided in a fuel passageway between a fuel pump and an air-fuel mixture forming device such as a carburetor all which form part of a fuel supply system for an engine of the motor vehicle. It is also known to provide the system with a vehicle speed sensor in addition to a fuel flow rate sensor so as to measures fuel consumption of the vehicle from input signals fed from the vehicle speed sensor and the fuel flow rate sensor.

As a fuel flow rate sensor employed in such a fuel consumption measuring system, an oscillating type of flow rate sensor or meter as shown in FIG. 1 of the accompanying drawings is known. As shown in FIG. 2 of the drawings, the flow rate sensor 10 is disposed in a fuel passageway 11 between a fuel pump (not shown) and an air-fuel mixture forming device which is a carburetor 12 in this example. As is shown in FIG. 1, the flow rate sensor 10 comprises a body or housing 13 formed with a chamber 14 partially having a generally cylindrical cross section. An inlet port 16 provides communication between the fuel pump and the chamber 14, and an outlet port 18 provides communication between the chamber 14 and a float chamber 19 of the carburetor 12. An oscillator 20 in the form of a pointed vane is pivotably mounted in the chamber 14 and extends from an upstream portion of the chamber 14 to a downstream portion thereof. A partition member 22 is arranged in the chamber 14 to be close to or to contact with the downstream end of the oscillator 20. The partition member 22 is spaced from a downstream internal wall surface of the chamber 14 to form therebetween a passage 23 which communicates with the outlet port 18. The partition member 22 has the cross section of an arcuate shape. The oscillator 20 is a pivoted vane which divides the chamber 14 at a location upstream from the partition member 22 into two sections 24 and 25. The partition member 22 defines a first outlet passage or nozzle 26 between one end thereof and an internal wall surface of the chamber 14 and a second outlet passageway nozzle 27 between the other end of the partition member 22 and an internal wall surface of the chamber 14. The first nozzle 26 provides communication between the section 24 and the passage 23 and the second nozzle 27 provides communication between the section 25 and the passage 23. The oscillator 20 is oscillated by fuel flow from the inlet port 16 into the chamber 14 so as to alternately engage an upstream end portion of the oscillator 20 with opposite upstream internal wall surfaces of the chamber 14 and to alternately communicate the inlet port 16 with the sections 24 and 25 to alternately pass a main flow of fuel fed into the inlet port 16 into the sections 24 and 25 of the chamber 14. When the upstream end portion of the oscillator 20 engages one of the upstream internal wall surfaces to pass a major portion or the main flow of fuel fed from the inlet port 16, into one of the sections 24 and 25, the oscillator 20 is urged and oscillated by the main fuel flow striking a downstream end portion of the oscillator 20, into a position in which the upstream end portion of the oscillator 20 is engaged with the other upstream internal wall surface of the chamber 14. This passes the main fuel flow from the inlet port 16 into the other one of the sections 24 and 25. By repeating such an operation, the oscillator 20 is alternately oscillated in opposite directions in the chamber 14 so that the main flow of fuel fed from the inlet port 16 is alternately passed from the nozzles 26 and 27 to the passage 23. Since the frequency of such an oscillation of the oscillator 20 is proportional to the fuel flow rate or representative of a function of the fuel flow rate, the fuel flow rate is measured by sensing the frequency of the oscillation of the oscillator 20. That is, when the flow rate is zero, the frequency of the oscillation produced in the flow rate sensor 10 is zero and as the flow rate is increased, the frequency of the oscillations produced in the flow rate sensor 10 is increased, for example, rectilinearly.

On the other hand, as the types of the fuel pump used in the fuel supply system for the engine, two types, that is, an electromagnetic type and a mechanical type are known. However, the two types of fuel pumps both generate pressurized fuel the pressure of which is alternately and repeatedly increased and reduced causing continuous periodic pressure pulsations as shown in FIG. 3 of the drawings. As a result, a pulsation of the pressure of fuel is produced in the fuel passageway 11 into which the pressurized fuel is fed from the fuel pump. When the pulsation of the fuel pressure is applied to the oscillating type flow rate sensor 10, the accuracy of measurement of flow rate by the flow rate sensor 10 is degraded to cause malfunction of the flow rate sensor 10. This is because, even when the supply of fuel from the air-fuel mixture forming device such as the carburetor to the engine is in fact zero and accordingly the frequency of oscillations in the flow rate sensor 10 is to be zero, a certain amount of fuel is passed through the flow rate sensor 10 by the pulsation of the fuel pressure to cause the oscillator 20 to oscillate with a frequency exceeding a value proportional to or representative of the flow rate of fuel fed to the engine which value is zero in this instance. As a result, the fuel consumption measuring system provides measurements representative of fuel consumption far higher than or inferior to an actual or real fuel consumption. Such a malfunction of the flow rate sensor 10, or such an influence of the pulsation of fuel pressure thereon, is especially conspicuous in engine operating range in which the speed of the vehicle is low and the flow rate of fuel fed to the engine is small. Also, the influence of the pulsation of fuel pressure on the flow rate sensor 10 becomes prominent when a fuel returning passage is provided between the fuel pump and the flow rate sensor 10, since the pulsation of fuel pressure is increased.

Various examples of the mechanism of the phenomenon of the flow rate sensor 10 being affected by the pulsation of fuel pressure are mentioned below.

1. Even if the amount of fuel fed from the carburetor to the engine is zero, a needle valve 28 is forced toward the interior of the float chamber 19 by the peak pressure of the pulsation above a predetermined valve. The needle value therefore assumes a position in which the peak pressure of the pulsation is balanced with a force urging the needle valve 28 in a direction to close an inlet port of the float chamber 19, as shown by the arrow in FIG. 2. As a result, when a certain amount of fuel flows into the float chamber 19 through the needle valve 28 to raise the level of fuel in the float chamber 19 from a normal or standard level $t_o$ to, for example, a level $t_x$ equal to or near the position or the height of the lower downstream edge of a main nozzle 29 by a value h, since the flow rate sensor 10 senses such a fuel flow, measurements indicate that fuel is consumed even though fuel is not in fact fed from the nozzle 29.

2. When a bubble of air in the fuel passageway 11 comes between the flow rate sensor 10 and the carburetor 12, it is compressed by the peak pressure of the pulsation of fuel pressure so that a certain amount of fuel flows through the flow rate sensor 10. That fuel flow is sensed by the flow rate sensor 10, and a measurement is displayed or obtained representing that the supply of fuel from the carburetor 12 to the engine is flowing even though the needle valve 28 is closed and fuel is not in fact fed from the nozzle 29.

3. When a pipe or hose forming the fuel passageway 11 between the flow rate sensor 10 and the carburetor 12 is expanded by the peak pressure of the pulsation of fuel pressure, due to a certain amount of fuel flowing through the flow rate sensor 10, the fuel consumption measuring system measures the fuel flow as if fuel is fed to the engine even though fuel is not in fact fed to the engine.

SUMMARY OF THE INVENTION

In view of the foregoing considerations it is an object of the invention to provide a flow rate measuring device in which the accuracy of the measurement of fuel flow rate by the flow rate sensor is prevented from being degraded by the pulsation of fuel pressure in the fuel passageway and disposing the flow rate sensor so that the real or correct value of flow rate of fuel fed to the engine can be measured by the flow rate sensor at all times and even when the vehicle is travelling at low speeds, that is, when a small amount of fuel is fed to the engine.

This object is accomplished by inserting a pressure bumper or buffer in the fuel passageway between the fuel pump and the flow rate sensor and by having the pressure bumper absorb or eliminate the pulsation of fuel pressure produced in the fuel passageway by the fuel pump to increase the accuracy of measurement of the flow rate sensor.

BRIEF DESCRIPTION OF THE DRAWINGS

This and other features and advantages of the invention will become more apparent from the following detailed description taken in connection with the accompanying drawings in which.

DESCRIPTION OF THE PREFERRED EMBODIMENT

Figure 1:
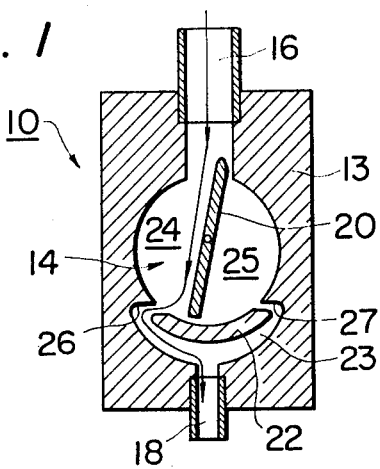
FIG. 1 is a cross sectional schematic view of a prior art, oscillating type, flow rate sensor.
Figure 2:
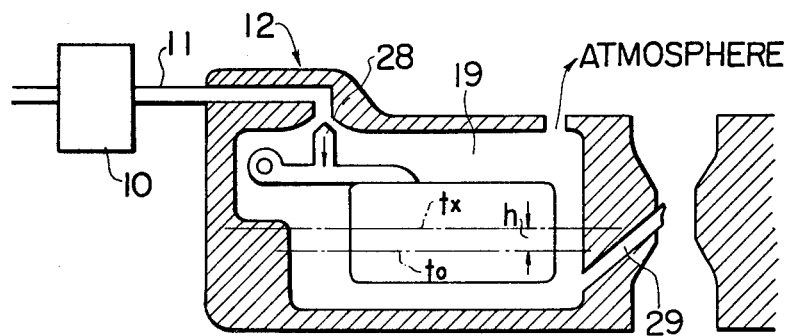
FIG. 2 is a cross sectional schematic view of a part of a fuel supply system for an engine which incorporates therein the flow rate sensor shown in FIG. 1.
Figure 3:
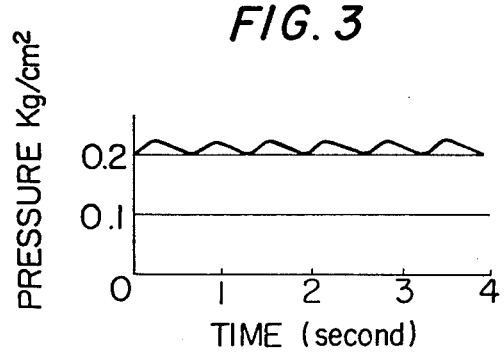
FIG. 3 is a graphic representation of the relationship between pressure and time during a pulsation of fuel pressure produced in a fuel passageway by a fuel pump.
Figure 4:
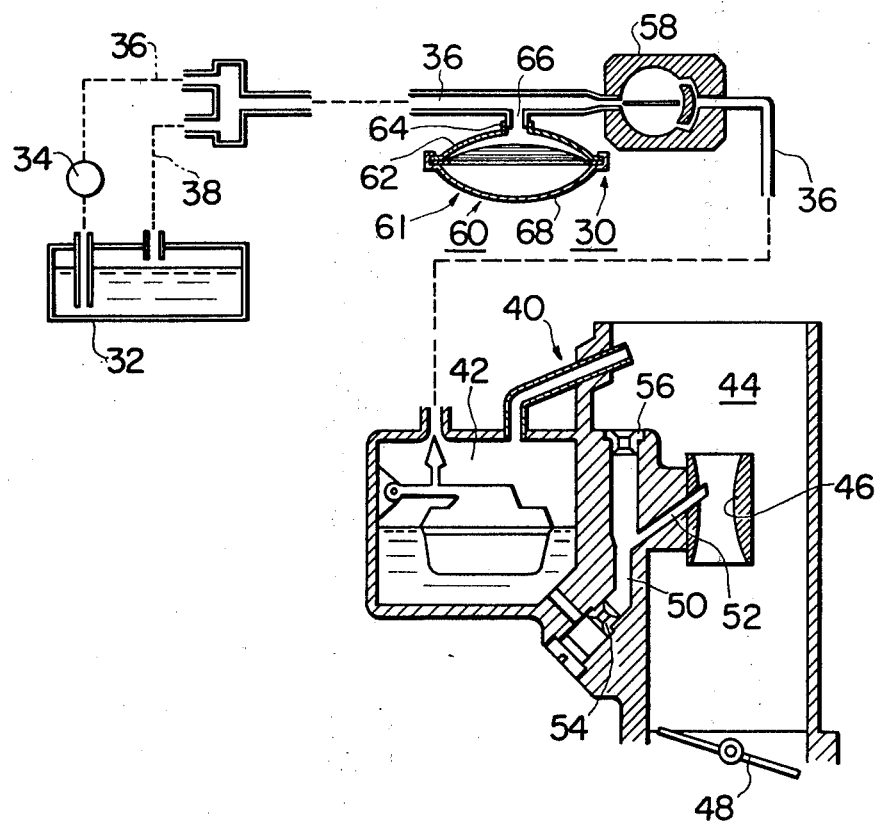
FIG. 4 is a cross sectional schematic view of a preferred embodiment of a flow rate measuring device according to the invention which is combined with a fuel supply system for an internal combustion engine.

Referring to FIG. 4 of the drawings, there is shown a preferred embodiment of a flow rate measuring device according to the invention. The fuel flow rate measuring device, generally designated by the reference numeral 30, forms part of a fuel consumption measuring system which is combined with a fuel supply system for an internal combustion engine of a motor vehicle. The fuel supply system includes a fuel tank or reservoir 32 containing liquid fuel therein, a fuel pump 34, a fuel passageway or conduit 36, a fuel return passageway of conduit 38, and an air-fuel mixture forming device, which is in this embodiment a conventional carburetor 40. The fuel pump 34 draws fuel from the fuel tank 32 and delivers fuel under pressure into the fuel passageway 36. The fuel return passageway 38 provides communication between the fuel passageway 36 and the fuel tank 32 for returning thereinto fuel delivered into the passageway 36. If desired the fuel return passageway 38 can be dispensed with, assuming one does not need the advantages of fuel return. The carburetor 40 includes a float chamber 42 communicating with the fuel passageway 36, an intake passageway 44 having a venturi 46 formed therein and a throttle valve 48 rotatably mounted therein, a main fuel supply passage 50 extending from the float chamber 42 and opening into the venturi 46 through a main nozzle 52 and formed threin with a main metering jet 54, and a main air bleed 56 communicating with the atmosphere and with the main fuel supply passage 50. The fuel delivered into the passageway 36 from the fuel pump 34 is conducted into the float chamber 42 and is then supplied in the form of a spray or cloud of fine liquid particles from the main nozzle 52 into the venturi 46 through the main jet 54 together with air from the air bleed 56. This mixture is then mixed with air supplied from the intake passageway 44 upstream of the venturi 46 to form an air-fuel mixture. The flow rate of the mixture drawn into a combustion chamber (not shown) of the engine is controlled by the degree of opening of the throttle valve 48, the vacuum in the venturi 46, and so on.

The fuel flow rate measuring device 30 comprises an oscillating type flow rate sensor or meter 58 located in the fuel passageway 36 between the fuel pump 34 and the float chamber 42 of the carburetor 40. The meter 58 is similar to the oscillating type of flow rate sensor 10 mentioned in the Description of the Prior Art. A pressure buffer, bumper or damper 60 is connected to the fuel passageway 36 between the fuel pump 34 and the flow rate sensor 58, upstream of the flow rate sensor for absorbing or buffering pertubations caused by pulsations of the fuel pressure produced in the passageway 36 by the operation of the fuel pump 34.

Figure 5:
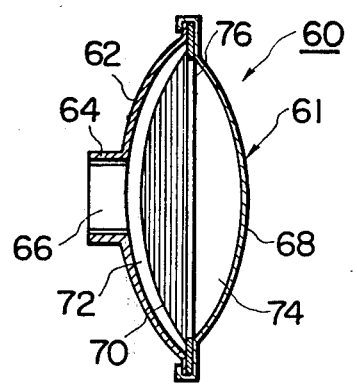
FIG. 5 is a schematic view of a first example of a pressure bumper forming part of the flow rate measuring device shown in FIG. 4.

As is best shown in FIG. 5 of the drawings, the pressure bumper 60 is of a diaphragm type and comprises a casing 61 including a first casing half member 62 having a connector 64 which is connected to the fuel passageway 36 and is formed therethrough with a bore or passage 66 communicating with the passageway 36, and a second casing half member 68 peripherally clamped to the first casing half member 62. A flexible diaphragm 70 is clamped at its peripheral portion between the first and second casing half members 62 and 68 so that it is located in the casing 61. The diaphragm 70 divides the interior of the casing 61 into first and second chambers 72 and 74. The chambers 72 and 74 both are sealed from the surrounding atmosphere by seal rings 76 clamped between each of the casing half members 62 and 68 and the diaphragm 70 at their peripheral portions. The first chamber 72 communicates with the fuel passageway 36 through the passage 66 of the connector 64. The diaphragm 70 is projected or cupped toward the first casing half member 62 so that the casing half 62 side of the diaphragm 70 is convex toward the casing half 62 and the casing half 68 side of the diaphragm 70 defines thereon a generally segmental spherical aperture or cavity forming part of the second chamber 74. The diaphragm 70 thus cupped in a hollow segmental spherical form is corrugated or stepped concentrically parallel with the clamped peripheral portion thereof to form a number of circular steps the diameters of which are gradually reduced toward the bottom of the segmental spherical form. The second chamber 74 is filled with air or an other suitable gas which has a suitable volume at a predetermined pressure. A diaphragm made of elastic and flexible material can be used in place of the diaphragm 70.

The fuel flow rate measuring device 30 thus described is operated as follows:

When a pulsation of the pressure of fuel is produced in the passageway 36 by the pump 34 and the fuel pressure in the passageway 36 is increased to the crest of the pulsation of the fuel pressure, the diaphragm 70 of the pressure bumper 60 is moved or deformed toward the second casing half member 68 by the increased fuel pressure to compress the air or gas contained in the second chamber 74. As a result, the increase in the fuel pressure in the passageway 36 is absorbed by the pressure bumper 60. Conversely, when the fuel pressure in the passageway 36 is reduced to the bottom or minimum value of the pulsation of the fuel pressure, the decrease in the fuel pressure causes expansion of the air or gas in the second chamber 74 to move or return the diaphragm 70 toward the first casing half member 62 to compensate for the decrease in the fuel pressure. As a result, the reduction in the fuel pressure in the passageway 36 is eliminated or alleviated by the pressure bumper 60.

Figure 6:
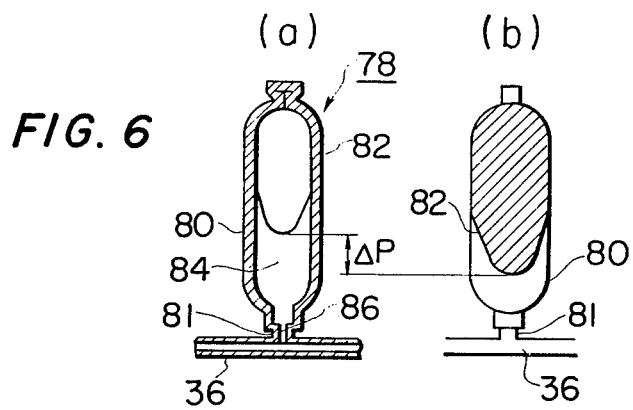
FIG. 6 is a schematic view of a second example of a pressure bumper forming part of the flow rate measuring device shown in FIG. 4.

Referring to FIG. 6 of the drawings, there is shown a second example or embodiment of a pressure bumper which is connected to the fuel passageway 36 of the fuel flow rate measuring device 30 shown in FIG. 4 similarly to and in lieu of the pressure bumper 60 shown in FIG. 5. As is shown in (a) of FIG. 6, the pressure bumper 78 is of an accumulator type and comprises a body or a container 80 which is in the form of, for example, a bomb which has a connector 81 for connecting the body 80 to the fuel passageway 36. A bag 82 made of flexible and elastic or elastomeric material is located within a portion of the interior of the body 80 remote from the passageway 36 and the connector 81 to define in the remaining portion of the interior of the body 80 a chamber 84 which is separated from the interior of the bag 82 and communicates with the passageway 36 via a passage or bore 86 formed through the connector 81. The bag 82 is partially fixedly secured to an internal wall surface of the container 80 and is filled with inert gas such as, for example, nitrogen gas which has a suitable volume at a predetermined pressure.

When the pressure bumper 78 is incorporated into the fuel flow rate measuring device 30 in lieu of the pressure bumper 60 and the pressure of fuel in the passageway 36 is increased to the peak of the pulsation of the fuel pressure, the increased fuel pressure compresses the gas contained in the bag 82 to contract it from a former position by a value of $\Delta P$ as shown in (a) and (b) of the FIG. 6. As a result, the pressure bumper 78 accumulates or absorbs the increased fuel pressure. Conversely, when the fuel pressure in the passageway 36 is reduced to the bottom of the pulsation of the fuel pressure, expansion of the gas in the bag 82 is caused by the decrease in the fuel pressure to release a portion of the pressure accumulated in the bag 82 and to expand the bag 82 from a former position by the value of $\Delta P$ as shown in (a) and (b) of FIG. 6. As a result, the decrease in the fuel pressure is compensated for and thus eliminated by the pressure bumper 78.

Figure 7:
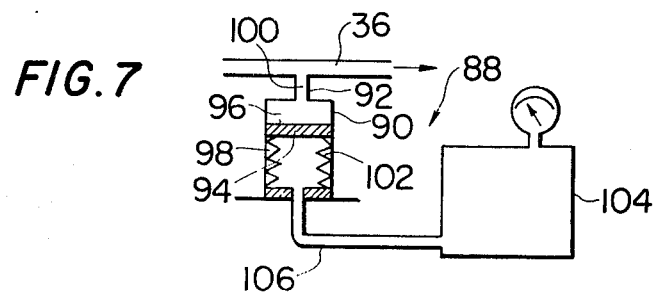
FIG. 7 is a schematic view of a third example of a pressure bumper forming part of a flow rate measuring device shown in FIG. 4.

Referring to FIG. 7 of the drawings, there is shown a third example or embodiment of a pressure bumper employed in the fuel flow rate measuring device 30 shown in FIG. 4 which is similar to and used in lieu of each of the pressure bumpers 60 and 78 shown respectively in FIGS. 5 and 6. As is shown in FIG. 7, the pressure bumper 88 is of a bellows type and comprises a housing or container 90 having a cylindrical shape and a connector 92 for connecting housing 90 to the fuel passageway 36. A piston or disk 94 is slidably fitted in the housing 90 and divides the interior of the housing 90 into first and second chambers 96 and 98. The first chamber 96 communicates with the fuel passageway 36 through a passage or bore 100 formed through the connector 92. A bellows 102 is located in the second chamber 98 and engages, at both ends thereof, the disk 94 and an end wall surface of the second chamber 98, respectively. An air or gas chamber 104 is located externally of the housing 90 and communicates with the interior of the bellows 102 through a passage or conduit 106. It is necessary that the pressure in each of the interior of the bellows 102 and the chamber 104 is maintained at a predetermined value when the interior of the bellows 102 has a predetermined volume.

When the pressure bumper 88 is incorporated into the fuel flow rate measuring device 30 in lieu of the pressure bumper 60 and the fuel pressure in the fuel passageway 36 rises and falls due to and the pulsation of the fuel pressure, the bellows 102 is contracted and expanded by the increased and reduced fuel pressure so that the variations in the fuel pressure are absorbed and eliminated or bumped by the pressure bumper 88, which operates in the same manner the pressure bumpers 60 and 78 described above.

Since the pulsation of the fuel pressure produced by the fuel pump is eliminated or is largely reduced or alleviated by the provision of a pressure bumper such as pressure bumpers 60, 78 or 88 as mentioned above, the error of measurement of the oscillating type of flow rate meter 58 is drastically reduced. As a result, it becomes possible to at all times accurately measure or indicate the real value of the quantity of fuel fed to the engine even during low speed vehicle travel during which the amount of fuel fed to the engine is small.

Figure 8:
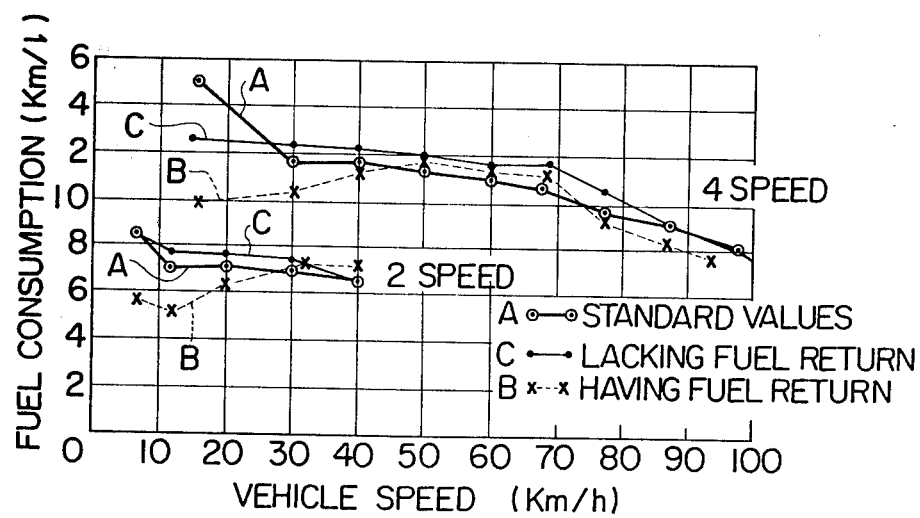
FIG. 8 is a graphic representation of the relationship between the speed of a vehicle and the fuel consumption thereof which is measured by a fuel consumption measuring system which is not provided with a flow rate measuring device according to the invention.
Figure 9:
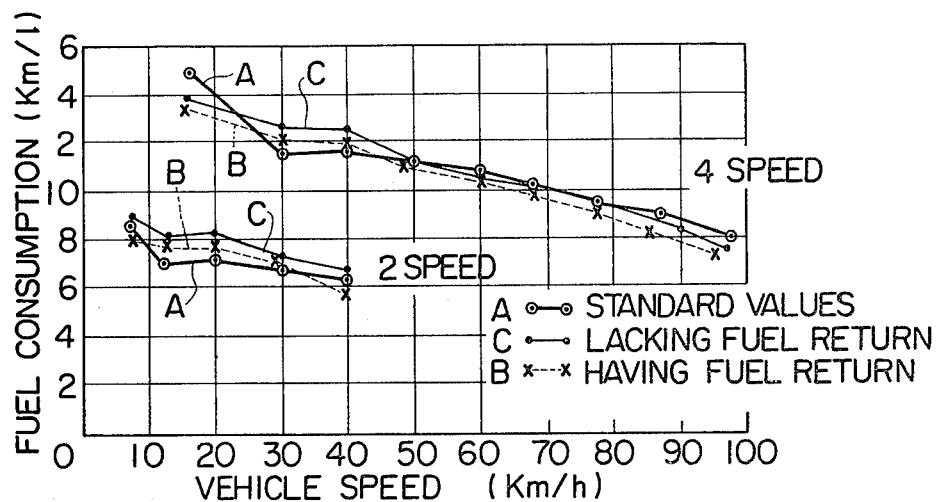
FIG. 9 is a graphic representation of the relationship between the speed of a vehicle and the fuel consumption thereof which is measured by a fuel consumption measuring system which is provided with a flow rate measuring device according to the invention.

Referring to both FIGS. 8 and 9 of the drawings, the relationships between the speed (Km/h) of a vehicle and the fuel consumption (Km/l) thereof in 2nd and 4th gear is shown. The curve A of each of FIGS. 8 and 9 shows standard values which were measured by a fuel consumption measuring system for a proving-ground test and are not affected by a pulsation of the fuel pressure produced in a fuel passageway by a fuel pump. Both of the curves B and C of FIG. 8 show values measured by a fuel consumption measuring system which is not provided with the flow rate measuring device 30 or the pressure bumper 60, 78 or 88. Each of the curves B and C of FIG. 9 shows values measured by a fuel consumption measuring system which is provided with the flow rate measuring device 30 or the pressure bumper 60, 78 or 88. The curve B of each of FIGS. 8 and 9 shows the case which employs a fuel supply system provided with the fuel return passage 38. The curve C of each of FIGS. 8 and 9 shows the case employing a fuel supply system which is not provided with the fuel return passage 38. As is seen from FIG. 8, the values in each of the curves B and C are plotted below the standard values or the fuel consumption in each of the curves B and C is worse than the fuel consumption in the curve A when the vehicle speed is low and the vehicle is in 4th gear. Furthermore, the values of the curve B are plotted below the values in the curve C. The reasons for the improved fuel consumption are explained by the following example.

Assuming the use of an oscillating type of flow rate sensor having an oscillating characteristics of 10 pulses per 1 cubic centimeter and an automobile whose an engine has the stroke volume in the 2 liter class, when the vehicle travels at the speed of 20 Km/h, it consumes fuel at a rate of about 24 cubic centimeters/min., and the frequency of oscillation of the flow rate meter is 4 Hz. When fuel is fed at this flow rate, the pulsation frequency of the pressure of a pressurized fuel pumped by an electromagnetic fuel pump is about 0.6 Hz. In an actually measured value in which a fuel return passage was not provided (curve C) the resultant frequency was $4+0.6=4.6$ Hz. On the other hand, in the case in which the fuel return passage is provided (the curve B), since a flow resistance is reduced at a position downstream of the fuel pump, the frequency of the pulsation of the fuel pressure produced by the fuel pump was increased as compared with the case of curve C and is about 3.8 Hz and accordingly, the resultant frequency was $4+3.8=7.8$ Hz. In other words, the curve B is affected by the pulsation of the fuel pressure produced by the fuel pump than the curve C is affected. In any case, it is understood that the pulsation of the fuel pressure produced by the fuel pump has influence upon the frequency of oscillation of the oscillating flow rate sensor, irrespective of the presence or absence of the fuel return passage as the vehicle speed enters the low operating range in which the quantity of fuel fed to the engine of the vehicle is small.

As is apparent from FIG. 9, since the values in each of the curves B and C are far closer to the standard values as compared with FIG. 8 when considering a low speed vehicle travelling range in which the amount of fuel fed to the engine is small, it is understood that the accuracy of measurement of the oscillating flow rate sensor 58 is drastically elevated by the provision of a pressure bumper such as one of the bumpers 60, 78 or 88.

Figure 10:
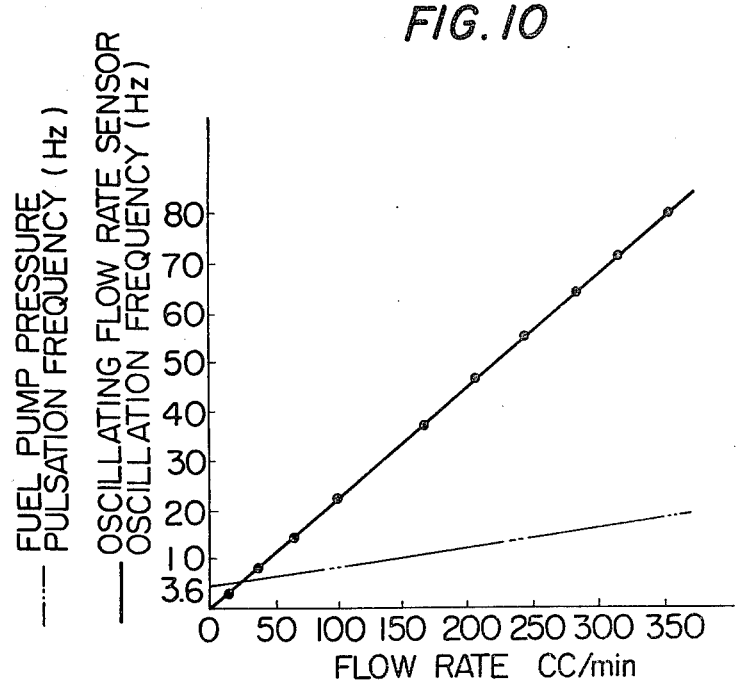
FIG. 10 is a graphic representation of the flow rate of fuel fed to an engine and both the frequency of oscillation produced by fuel flow in an oscillating type of flow rate sensor and the frequency of a pulsation of the pressure of a pressurized fuel generated by a fuel pump.

Referring to FIG. 10 of the drawings, the relationship is shown between the flow rate of fuel fed to the engine of a vehicle, which is indicative of the speed of the vehicle, and both the frequency of oscillation of an oscillating type of flow rate meter similar to the flow rate meter 58 and the frequency of a pulsation of the pressure of the pressurized fuel produced by a fuel pump of the vehicle wherein a fuel passage has a fuel return passage. As is apparent from FIG. 10, the frequency of oscillation of the flow rate sensor per se varies, i.e.; rectilinearly proportional to the fuel flow rate, while the frequency of the pulsation of the fuel pressure has a certain value even when the fuel flow rate is zero. Furthermore the pulsation frequency increases with an increase in the fuel flow rate at a rate far lower than the rate of the increase of the oscillation frequency. Accordingly, the following matters will be understood. Since the frequency of the flow rate sensor is greater than the frequency of the fuel pressure pulsation in a range in which the fuel flow rate is large, the influence of the fuel pressure pulsation can be neglected. However, since the difference between the frequency of the fuel pressure pulsation and the frequency of the flow rate sensor is low in a range in which the fuel flow rate is small, the frequency of the fuel pressure has a great influence on the accuracy of measurement of the flow rate sensor which can not be neglected.

It has been ascertained by an experiment that the pressure bumper is required to have and volume of 40 cubic centimeters for eliminating the error of measurement of the fuel flow rate when a passenger car equipped with an engine having the stroke volume of 2000 cubic centimeters travels at a speed within the range of 20 to 40 Km/h in top gear. Accordingly, 20 to 80 cubic centimeters are sufficient volumes of the pressure bumper for an ordinary passenger car.

Although the invention has been described as being applied to a fuel supply system for an engine of a motor vehicle which includes a fuel consumption measuring system, a flow rate measuring device according to the invention can be applied to a fluid supply system for feeding any fluid to fluid consuming means.

The invention can be applied to a system including an oscillating type of flow rate sensor and a vehicle speed sensor and computing fuel consumption of a motor vehicle from output signals fed from the vehicle speed sensor and the flow rate sensor.

It will be thus appreciated that the invention provides a flow rate measuring device which greatly improves the accuracy of measurement of flow rate by an oscillating type of flow rate meter.

What is claimed is:

1. A liquid fuel supply system for an internal combustion engine comprising:

a reservoir for storing liquid fuel;

a pump connected to the reservoir for pumping fuel therefrom;

a carburetor connected to the engine for charging the engine, said carburetor having a float chamber;

a fuel line connecting the pump to the float chamber of said carburetor for delivering pumped fuel thereto;

a flow rate sensor disposed in said fuel line between said pump and the float chamber of said carburetor, said flow rate sensor including oscillating means having a frequency of oscillation porportional to the rate of fuel flow through said fuel line, the oscillating means comprising a pivoted vane disposed in a cavity within said flow rate sensor which alternatively directs fuel to spaced outlet passages as the vane oscillates; and a pressure accumulator inserted in the fuel line between the pump and the flow rate sensor in series with and upstream of the flow rate sensor for damping continuous periodic pressure pulsations generated in the fuel flowing through the fuel line due to operation of the pump, the pressure accumulator comprising a chamber having a pair of compartments separated by a movable wall wherein only one compartment is connected to the fuel line and the other compartment contains a compressible means for absorbing energy due to increases in fuel pressure and releasing the energy thus absorbed during decreases in fuel pressure so as to effect said damping.

2. The liquid fuel supply system of claim 1 wherein said compressible means is a gas and wherein said movable wall is a diaphragm which is convex with respect to said compartment connected to the fuel line and concave with respect to said other compartment containing said gas.

3. The liquid fuel supply system of claim 2 wherein the fuel system further includes means for returning fuel to the reservoir.

4. The liquid fuel supply system of claim 2 wherein said diaphragm is stepped concentrically to form a number of circular steps.

5. The liquid fuel supply system of claim 1 wherein said compressible means is a gas and wherein said movable wall is a bag containing said gas.

6. The liquid fuel supply system of claim 5 wherein the fuel system further includes means for returning fuel to the reservoir.

7. The liquid fuel supply system of claim 1 wherein said compressible means is a gas and wherein said movable wall is a bellows containing therein said gas and further including means defining a gas chamber outside of said chamber of said pressure accumulator, said gas chamber communicating with the interior of said bellows and containing said gas.

* * * * *